H. L. BALDERSTON.
THERMOMETER.
APPLICATION FILED JUNE 2, 1911.
1,014,800.
Patented Jan. 16, 1912.

UNITED STATES PATENT OFFICE.

HENRY L. BALDERSTON, OF PHILADELPHIA, PENNSYLVANIA.

THERMOMETER.

1,014,800. Specification of Letters Patent. Patented Jan. 16, 1912.

Application filed June 2, 1911. Serial No. 630,798.

*To all whom it may concern:*

Be it known that I, HENRY L. BALDERSTON, a citizen of the United States, residing in Philadelphia, county of Philadelphia, State of Pennsylvania, have invented certain new and useful Improvements in Thermometers, of which the following is a specification.

My invention relates to improvements in thermometers, and it has for its object to provide a thermometer having an index consisting of suitable material which is colored and which is situated on the top of the heat measuring column of the thermometer and moves up and down therewith so as to render the top of the column easily visible.

My invention is particularly useful and desirable in connection with thermometers which may be employed industrially for the purpose of ascertaining the temperatures of ovens, boilers and other similar chambers which have been raised to high temperatures in the carrying out of industrial processes and operations. The plants or rooms in which such work is usually carried on are apt to be dark and may be filled with vapor, and it is very desirable and practically essential that some means be provided which will render the height of the column of liquid visible in the thermometer tube. For the purpose of accomplishing this desirable result, I have provided in the thermometer tube a suitable liquid and upon the top of the column of such liquid a colored index of suitable material, which, as already indicated, is in contact with the top of the said column of liquid and moves up and down therewith in the tube and thus renders the top of the heat measuring column of liquid easily visible.

At the present time in thermometers embodying my invention as the same have been constructed by me, the main body of the column of liquid consists of mercury the boiling point of which is high and on top of this is employed a small column or portion of liquid consisting of creosote colored by any suitable coloring or dyeing agent. It should be understood, however, that within the scope of the claims any other suitable material may be employed as the heat measuring column and also that any other suitable colored material which will follow the up and down movements of the heat measuring column in the thermometer tube may be employed.

Broadly speaking my invention comprehends a thermometer in which the heat measuring or indicating column consists of any suitable material the height of which in the thermometer tube varies as the temperature varies and which thermometer is provided with an index of any suitable colored material which is situated in contact with the said heat measuring column and moves up and down in the tube with the said column so that the top of the column is easily visible.

My invention also comprehends a thermometer in which the heat measuring or indicating column consists of two liquids one of which rests upon the other and is colored for the purpose of rendering the top of the heat measuring column easily visible. By thus providing a colored index upon the top of the heat measuring column which moves up and down in the thermometer tube with the said column, the height of the column is easily visible even though the thermometer may be located in a darkened room and even though there may be more or less vapor in the room in which the thermometer is located.

I am aware of the fact that heretofore thermometers have been made and used in which the entire column of heat measuring liquid in the tube is colored, but such thermometers have been worthless for use in the measurement of high temperatures because the liquid has been and is of such character that it boils at relatively low temperatures. I do not believe that heretofore anyone has constructed a thermometer in which the heat measuring column consisted of a liquid such as mercury boiling only at a high temperature and having thereon and in contact therewith a small portion of colored liquid constituting means for rendering the top of the column easily visible. Perhaps it should be mentioned here that if a body of liquid such as mercury is colored the liquid is so affected that its accuracy in measuring heat temperatures is destroyed.

My invention is illustrated by a single figure in the drawings, in which 1 designates the thermometer tube, the graduations of which begin at 200 degrees and extend to 400 degrees. It will, of course, be understood that the graduations may extend to such higher number as may be desired and may, if desired, begin at a lower number.

2 designates a column of liquid terminating at its lower end in a bulb 3 in the usual manner.

4 designates a small portion of liquid of a different kind from the liquid 2.

As already stated, I am at present employing mercury as the heat measuring column and creosote dyed a bright color so that the same is easily visible.

As will be seen upon reference to the drawing, the liquid 4, constituting an index, is situated in contact with the top of the column of mercury 2 and as the column of mercury expands and contracts the colored creosote 4 moves up and down in the tube and renders the top of the column of mercury easily visible. With regard to the portion of liquid 4 it should be stated that the kind of liquid used is immaterial except that it must be of such character that the parts thereof are coherent and it also must be of a character which, if not naturally colored, will permit of coloration by some suitable coloring or dyeing agent.

As is well known, the specific gravity of mercury is much greater than that of the creosote 4 and preferably the liquid constituting the main body of the column 2 should be of higher specific gravity than that of the colored portion of liquid 4, but I do not desire to limit my invention to liquids having different specific gravities. It is necessary, however, that the characteristics of the two liquids employed shall be such that they will not readily intermix otherwise the colored portion of liquid 4 would intermix with the main body of the column which, as already indicated, would be objectionable.

It will be understood that the thermometer tube is inserted into the chamber or into the material the temperature of which it is desired to know only a very short distance above the bulb 3.

When the colored portion 4 consists of creosote or some other liquid which boils at a much lower temperature than mercury, the tube must not be inserted to such a depth that such colored portion of liquid is heated to the boiling point. For this reason the thermometer tube is generally made quite long so that the portion of colored liquid 4 is kept as cool as is practically possible. The tube above the liquids 2 and 4 is filled with some suitable gas, such as nitrogen, and the tube may be bent if desired.

Although not illustrated, it will be understood that the thermometer is in practice mounted in some form of suitable casing but as the casing itself constitutes no part of my invention and as any desirable form and design of casing may be employed, I have deemed it unnecessary to illustrate the same.

Having thus described my invention, I claim:

1. A thermometer consisting of a tube having a heat measuring column the main body portion of which consists of one liquid and a small portion of colored liquid located above and in contact with the top of the main or body portion of liquid.

2. A thermometer consisting of a tube having a heat measuring column therein consisting of two liquids the boiling point of one of which is high and which constitutes the main or body portion of the column and the other one of which consists of a small portion of colored liquid located above and in contact with the first-named portion.

3. A thermometer consisting of a tube having a heat measuring column therein which consists of two liquids the specific gravity and boiling point of one of which constituting the main or body portion of the column are high and the other one of which consists of a small portion of colored liquid of low specific gravity and relatively low boiling point which is located above and in contact with the first-named portion of liquid.

In testimony that I claim the foregoing as my invention, I have hereunto signed my name this 2nd day of May, A. D. 1911.

HENRY L. BALDERSTON.

In the presence of—
EDWARD J. FISHER,
CARRIE E. KLEINFELDER.

---

Copies of this patent may be obtained for five cents each, by addressing the "Commissioner of Patents, Washington, D. C."